(12) United States Patent
Förster

(10) Patent No.: US 12,123,755 B2
(45) Date of Patent: Oct. 22, 2024

(54) MEASURING SYSTEM AND METHOD FOR OPERATING A MEASURING SYSTEM

(71) Applicant: KROHNE Messtechnik GmbH, Duisburg (DE)

(72) Inventor: Jan Förster, Essen (DE)

(*) Notice: Subject to any disclaimer, the term of this patent is extended or adjusted under 35 U.S.C. 154(b) by 262 days.

(21) Appl. No.: 17/935,609

(22) Filed: Sep. 27, 2022

(65) Prior Publication Data

US 2023/0113277 A1  Apr. 13, 2023

(30) Foreign Application Priority Data

Sep. 27, 2021 (DE) .......................... 102021124962.7

(51) Int. Cl.
*G01F 1/58* (2006.01)
*G01F 1/74* (2006.01)

(52) U.S. Cl.
CPC ............... *G01F 1/584* (2013.01); *G01F 1/58* (2013.01); *G01F 1/74* (2013.01)

(58) Field of Classification Search
CPC ............... G01F 1/58; G01F 1/584; G01F 1/74
See application file for complete search history.

(56) References Cited

U.S. PATENT DOCUMENTS

| | | | |
|---|---|---|---|
| 3,902,366 | A | 9/1975 | Gruner |
| 4,679,442 | A | 7/1987 | Kubota |
| 2013/0049770 | A1* | 2/2013 | Basu ................ G01N 33/2823 324/693 |
| 2017/0261357 | A1 | 9/2017 | Wang et al. |
| 2018/0245956 | A1 | 8/2018 | Momose |

FOREIGN PATENT DOCUMENTS

CN  112050871 A  12/2020

OTHER PUBLICATIONS

Xiang Denga et al; Theoretical study of vertical slug flow measurement by data fusion from electromagnetic flowmeter and electrical resistance tomography; Flow Measurement and Instrumentation 22 (2011) 272-278; Journal homepage www.elsevier.com/locate/flowmeasinst.

* cited by examiner

*Primary Examiner* — Peter J Macchiarolo
*Assistant Examiner* — John M Royston
(74) *Attorney, Agent, or Firm* — Patrick D. Duplessis

(57) ABSTRACT

A method for operating a measuring system includes: carrying out impedance measurements with at least three property measurement electrodes on a medium in a first region of a measuring tube interior over an impedance measurement period and, at the same time, signaling the impedance measurement period by a measuring signal to a flow measurement controller; determining a property of the medium from the impedance measurements using impedance tomography; generating a magnetic field in the medium in a second region of the measuring tube interior by the flow measurement controller using a magnetic field generator; carrying out voltage measurements at a sampling rate using at least two flow measurement electrodes on the medium in the second region; taking an impedance measurement duration from the measuring signal; and discarding the voltage measurements carried out during the impedance measurements; and determining a flow rate of the medium from the remaining voltage measurements.

21 Claims, 2 Drawing Sheets

MEASURING SYSTEM AND METHOD FOR OPERATING A MEASURING SYSTEM

TECHNICAL FIELD

In one aspect, the invention relates to a measuring system comprising a measuring tube, a liner, a property measuring device and a flowmeter.

The measuring tube has a measuring tube interior along a measuring tube longitudinal axis. The measuring tube interior is lined with the liner. The liner electrically insulates the measuring tube from a medium in the measuring tube interior and protects the measuring tube from wear by the medium.

The property measuring device has a property measurement controller and at least three property measurement electrodes. The at least three property measurement electrodes are arranged on the measuring tube in a first region of the measuring tube interior.

The property measurement controller is configured to initially carry out a number of impedance measurements with the at least three property measurement electrodes on the medium in the first region over an impedance measurement period, and then determine at least one property of the medium from the impedance measurements using impedance tomography.

The flowmeter includes a flow measurement controller, a magnetic field generator, and at least two flow measurement electrodes. The magnetic field generator and the at least two flow measurement electrodes are arranged on the measuring tube in a second region of the measuring tube interior, which is different from the first region.

The flow measurement controller is designed for generating a magnetic field in the medium in the second region with the magnetic field generator, for carrying out a number of voltage measurements at a sampling rate with the at least two flow measurement electrodes on the medium in the second region, and for determining a flow rate of the medium from the voltage measurements.

Further, the invention also relates to a method for operating a measuring system.

The measuring system comprises a measurement tube, a liner, a property measuring device, and a flowmeter.

The measuring tube has a measuring tube interior along a longitudinal measuring tube axis. The measuring tube interior is lined with the liner. The liner electrically insulates the measuring tube from a medium in the measuring tube interior and protects the measuring tube from wear by the medium.

The property measuring device has a property measurement controller and at least three property measurement electrodes. The at least three property measurement electrodes are arranged on the measuring tube in a first region of the measuring tube interior.

The flowmeter has a flow measurement controller, a magnetic field generator, and at least two flow measurement electrodes. The magnetic field generator and the at least two flow measurement electrodes are arranged on the measuring tube in a second region of the measuring tube interior that is different from the first region.

During operation of the measuring system, the property measurement controller initially carries out a number of impedance measurements using the at least three property measurement electrodes on the medium in the first region over an impedance measurement period, and then determines at least one property of the medium from the impedance measurements using impedance tomography.

Further, during operation of the measuring system, the flow measurement controller uses the magnetic field generator to generate a magnetic field in the medium in the second region, carries out a number of voltage measurements at a sampling rate using the at least two flow measurement electrodes on the medium in the second region, and determines the flow rate of the medium from the voltage measurements.

The at least three property measurement electrodes are arranged on the measuring tube in such a way that, on the one hand, they are electrically insulated from the measuring tube, since the latter is made of an electrically conductive material, and, on the other hand, they can come into galvanic contact with the medium in the measuring tube. Usually, the at least three property measurement electrodes are arranged annularly around the measuring tube. The at least two flow measurement electrodes are arranged on the measuring tube in such a way that, on the one hand, they are electrically insulated from the measuring tube and, on the other hand, they can come into galvanic contact with the medium in the measuring tube.

The at least three property measurement electrodes of the property measuring device are arranged in the first region and the magnetic field generator and the at least two flowmeter electrodes of the flowmeter, which are separate from the at least three property measurement electrodes, are arranged in the second region of the same measuring tube interior in such close proximity to each other that an impedance measurement carried out by the property measuring device interferes with a voltage measurement carried out simultaneously by the flowmeter. The interference is caused by electric fields associated with the impedance measurements. However, external electric fields also interfere with both the impedance and voltage measurements. However, this arrangement makes the measuring system more compact, particularly with respect to an extension along the longitudinal axis of the measuring tube, than a conventional measuring system in which the property measurement electrodes and the flow measurement electrodes are either spaced so far apart that the measurements do not interfere with each other or in which the property measurement electrodes and the flow measurement electrodes are arranged in separate measuring tube interiors. Accordingly, the compactness of the measurement system compared to this conventional measuring system is traded for the impedance measurements interfering with the voltage measurements. A first and a second measuring tube interior are separate from each other, in particular, when each of the measuring tube interiors has a separate liner which electrically isolates the measuring tube from a medium in the respective measuring tube interior.

The measuring system is integrated into a higher-level system when used in industrial applications. In particular, the measuring tube, the property measurement controller, and the flow measurement controller, which is separate from the property measurement controller, are connected to the system. During operation of the measuring system, a medium is made to flow through the measuring tube from the higher-level system, and the property measuring device and the flowmeter carry out what they are designed to do as described. In many applications for which the measuring system is intended, the medium has solid components as well as liquid components. Thus, the measuring system is designed for media with solid components. Solid components are, for example, sand, gravel and ores.

The flowmeter is a magnetic-inductive flowmeter. An electrically conductive medium flowing through the measuring tube interior is permeated by the magnetic field in the second region of the measuring tube interior, whereby a voltage is induced in the flowing medium which can be measured by the at least two flow measurement electrodes during a voltage measurement. Ultrasonic meters cannot be used because of the possible solid components of the medium. Coriolis measuring device are out of the question due to the tube shapes required for their working principle and their acquisition costs. In particular, Coriolis measuring devices are larger than magnetic-inductive flowmeters, making the desired compactness of the measuring system unfeasible. Further, unlike those of ultrasonic and Coriolis flowmeters, the measuring tube interiors of magnetic-inductive flowmeters can be lined with more resistant liners.

The property measuring device is a measuring device which implements electrical impedance tomography and is suitable for determining the at least one property. In the present case, properties of the medium are meant which can also be determined in particular using radiometric tomography methods. However, radiometric tomography methods use radioactive radiation, which has various disadvantages. For example, the source of the radioactive radiation has a hazard potential, the disposal of the source is associated with high costs, and operators of the measuring device must be trained to handle radiation sources. Therefore, radiometric tomography techniques are unsuitable compared to electrical impedance tomography techniques.

Lining the inside of the measuring tube with the liner causes the liner to wear out instead of the measuring tube, especially due to solid components of a medium. Although the cost of replacing a worn liner with a new liner is less than replacing a worn measuring tube with a new measuring tube, in both cases the measuring system must be removed from the higher-level system. Removing the measuring system means that the system cannot continue to operate for the time it takes to replace the liner. Compared to conventional measuring systems, however, the effort required for the compact measuring system is significantly lower due to its compactness.

BACKGROUND

In many industrial applications, a flow and at least one property of a medium are required to control or evaluate a process. Such applications are, for example, a controller of a conveying process in the mining of mineral resources and a controller of a conveying process on a dredging ship. These conveying processes involve conveying a medium that usually contains solid components as well as liquid ones. In addition to knowledge of a flow rate of the medium, they also require knowledge of properties of the medium, in this case knowledge of a ratio between the solid and liquid components and/or knowledge of a size distribution of the solid components. Only if the flow rate and the properties are known, can the conveying process be optimally controlled. This means that the conveying speed can be adjusted with this knowledge in such a way that, on the one hand, no sedimentation and, on the other hand, no unnecessarily high wear of the liner occurs. Sedimentation occurs when the conveying speed is too low or the proportion of solid components in relation to the liquid components is too high. Unnecessarily high wear of the liner occurs when the conveying speed is too high for the given size distribution of the solids. Further, conveying can be adjusted so that an unnecessarily high amount of liquid constituents is not conveyed relative to the solid constituents when the solids are the desired constituents and the liquid constituents are only a conveying medium. An unnecessarily high proportion of liquid constituents means poor conveying efficiency.

It has already been derived above that disadvantages of the measuring system and the method are that voltage measurements are affected by impedance measurements and that both voltage and impedance measurements are affected by external electric fields. It is therefore object of the present invention to provide both a compact measuring system and a method for operating a compact measuring system in which the problems pointed out are at least mitigated.

SUMMARY

The object is achieved by a method for operating a measuring system having the disclosed features.

The measuring system which carries out this method additionally has a shielding and a signal line. The shielding shields the measuring tube interior from external disturbances. External disturbances are generated by external fields, in particular electric fields. The flow measurement controller and the property measurement controller are connected to each other via the signal line.

During operation, the measuring system carries out the following method:

The property measurement controller first carries out the number of impedance measurements with the at least three property measurement electrodes on the medium in the first region over the impedance measurement period, and meanwhile the impedance measurement period is signaled by a measuring signal via the signal line to the flow measurement controller, and then the at least one property of the medium is determined from the impedance measurements using impedance tomography. The measuring signal is preferably a digital signal.

The magnetic field generator is used by the flow measurement controller to generate the magnetic field in the medium in the second region, a number of voltage measurements are carried out at the sampling rate using the at least two flow measurement electrodes on the medium in the second region, the flow measurement controller takes the impedance measurement duration from the measurement signal, discards the voltage measurements carried out during the impedance measurements, and determines a flow rate of the medium from the remaining voltage measurements.

By shielding the interior of the measuring tube, both the impedance and voltage measurements are shielded from external interference. By discarding the voltage measurements made during the impedance measurements, the interference of the voltage measurements with the impedance measurements is at least reduced.

In one design of the method, resistance measurements are carried out as the impedance measurements and the at least one property of the medium is determined from the impedance measurements, which are then resistance measurements, using resistance tomography. In an impedance measurement on the medium, a resistance and a reactance of the medium are determined. In contrast, in a resistance measurement, only a resistance of the medium is determined. Accordingly, the effort of a resistance measurement is less than that of an impedance measurement. Thereby, the determination of the at least one property of the medium using resistance tomography is carried out with sufficient accuracy with respect to the determination of the at least one property using impedance tomography.

In one design, the at least one property of the medium is a proportion and/or a size of solid constituents in the medium. Further, a size distribution of the solid components is then determined e.g. from the size of the specific components.

In one design, after determining the at least one property of the medium, the property measurement controller waits a duration before carrying out the next number of impedance measurements. In this case, the duration is such that the next number of impedance measurements does not begin until the voltage measurements have been completed.

In one design, the flow rate of the medium is determined from the remaining voltage measurements only if a number of the remaining voltage measurements is at least 30, preferably 40, and particularly preferably 50. Studies have shown that determining the flow rate from at least 30 voltage measurements provides sufficient accuracy, with 40 or even 50 voltage measurements further increasing the accuracy. While there is an increase in accuracy with more than 50 voltage measurements, the only further small increase in accuracy does not justify the time required for the additional measurements.

In one design, an average is taken from the remaining voltage measurements during determination of the flow rate and for determining the flow rate. Accordingly, the flow rate is determined using the average value.

In a further design, the method of the preceding design is carried out multiple times, generating a number of average values. In each execution of the method, an average value is generated. A trend is then determined from the number of average values and, using the trend, any existing gaps in a temporal sequence of the average values are filled. A gap in the time sequence occurs, for example, when so many stress measurements are discarded that the flow rate is not determined. If a gap in the sequence of averages is filled using the trend, then determining the flow of the medium using the average in the gap is more accurate than if the gap is not filled.

In a further design of the preceding further design, the trend is formed from a number of average values ranging from 3 to 7. Studies have shown that a number of less than 3 average values leads to an excessive impairment of the determination of the flow rate, and that a number of more than 7 average values leads only to an insignificant improvement of the determination of the flow rate with respect to the effort required for this.

In one design of a method in which a trend is determined, changes between younger average values are weighted more heavily than changes between older average values when determining the trend. In this case, an older average value is determined before a younger average value in terms of time. By determining the trend in this way, gaps in the sequence of average values are filled more accurately, which also makes the determination of the flow of the medium more accurate.

In a further development of the previously described design, the trend is determined by first determining a slope between each of two successive average values, and then determining an average slope by determining an average value first from the two oldest slopes and then from each of the previously determined average value and the next youngest slope. The average values are preferably determined as linear average values.

In a further design of the method, the magnetic field generator of the measuring system is designed to generate a switched DC magnetic field with a first magnetic field direction and a second magnetic field direction of the magnetic field that is antiparallel to the first. In the design of the method, the magnetic field generator is controlled by the flow measurement controller to generate the switched DC magnetic field, the number of voltage measurements is taken once during the first magnetic field direction and once during the second magnetic field direction, and the flow rate of the medium is determined from both numbers of voltage measurements. If voltage measurements are discarded during one of the two magnetic field directions due to impedance measurements, then the corresponding voltage measurements are also discarded during the other of the two magnetic field directions.

The switched DC magnetic field has a rectangular shape over time. Controlling the magnetic field generator causes the magnetic field to change either from the first magnetic field direction to the second magnetic field direction or from the second magnetic field direction to the first magnetic field direction. A change of the magnetic field direction is accompanied by a settling of the magnetic field, which has the same magnitude in both magnetic field directions after the settling. The voltage measurements are carried out after the magnetic field has settled, i.e. when it has settled.

In a further development of the above method and when an average is formed, the number of averages is determined separately for the first magnetic field direction and for the second magnetic field direction.

In a further development thereof, a switch-over time of the switched DC magnetic field is signaled by the flow measurement controller via the signal line to the property measurement controller when the magnetic field generator is driven, and the switch-over time is taken from the switch-over signal by the property measurement controller, and the impedance measurements are started at the switch-over time. The switch-over time is thus the time when the magnetic field direction changes.

The method steps described in connection with the determination of the at least one property of the medium are carried out by the property measurement controller, unless otherwise specified. The method steps described in connection with determining the flow rate of the medium are carried out by the flow rate measurement controller, unless otherwise specified.

The derived object is also achieved by a measuring system having the disclosed features.

The measuring system is characterized in that the measuring system comprises a shielding and a signal line. The shielding thereby shields the measuring tube interior from external interference. The flow measurement controller and the property measurement controller are connected to each other via the signal line.

Further, the property measurement controller is additionally designed to signal the impedance measurement duration by a measurement signal via the signal line to the flow measurement controller during the impedance measurements.

Further, the flow measurement controller is designed to take the impedance measurement duration from the measurement signal, to discard the voltage measurements carried out during the impedance measurements and to determine the flow rate of the medium from the remaining voltage measurements.

In one design of the measuring system, the impedance measurement controller and the flow measurement controller are designed such that a delay time of the measurement signal is less than a period of the sampling rate. This prevents voltage measurements from being discarded during which no impedance measurements are carried out at all, or voltage measurements from being used during which impedance measurements are carried out.

Furthermore, the object is also achieved by a measuring system having the disclosed features The measuring system is characterized in that the measuring system comprises a shielding, a signal line and a clock-pulse generator. The shielding shields the interior of the measuring tube from external interference. The flow measurement controller and the property measurement controller are connected to each other via the signal line, on the one hand, and to the clock-pulse generator, on the other hand, respectively. Preferably, both the connection between the clock-pulse generator and the flow measurement controller and the connection between the clock-pulse generator and the property measurement controller each have galvanic isolation.

The clock-pulse generator is designed to generate a clock-pulse with a clock period. The flow measurement controller and the property measurement controller are designed for carrying out the impedance measurements and the voltage measurements at different times depending on the clock-pulse.

The property measurement controller has an initialization phase and is designed for signaling a completion of the initialization phase by a first completion signal via the signal line to the flow measurement controller.

The flow measurement controller has an initialization phase and is designed for signaling a completion of the initialization phase by a second completion signal via the signal line to the property measurement controller.

Further, the property measurement controller is designed for starting the execution of the impedance measurement triggered by receiving the second termination signal.

Furthermore, the flow measurement controller is designed for starting generation of the magnetic field triggered by receiving the first termination signal.

Due to the design of the flow measurement controller and the property measurement controller, impedance measurements and voltage measurements are carried out at mutually different times depending on the clock-pulse, it is ensured that mutual interference of the measurements is excluded.

In one design of the measuring system, a duration for carrying out the impedance measurements and the determination of the at least one property of the medium form a property measurement cycle. Further, a duration for generating the magnetic field, the carrying out of the voltage measurements, and the determination of the flow rate of the medium form a flow measurement cycle. Further, the property measurement cycle and the flow measurement cycle are each an integer multiple of the clock period.

In a further development of the above, the integer multiple is equal to $2^n$, where n is a positive integer.

In a further design, the measuring system has a ground potential and the shielding is implemented in that the measuring tube has a connection to the ground potential at each end of the measuring tube interior.

In a further design, the signal line has galvanic isolation. The galvanic isolation prevents ring currents via the property measuring device, the flowmeter and the medium.

In a further design, the measuring system is designed for carrying out one of the methods described above.

In all other respects, the explanations regarding the methods apply accordingly to the measuring systems and vice versa. In particular, the methods can also be carried out on the measuring systems described above.

BRIEF DESCRIPTION OF THE DRAWINGS

In detail, there is a multitude of possibilities for designing and further developing the measuring system and the method. For this, reference is made to the following description of preferred embodiments in connection with the drawings.

DETAILED DESCRIPTION

Figure 1:
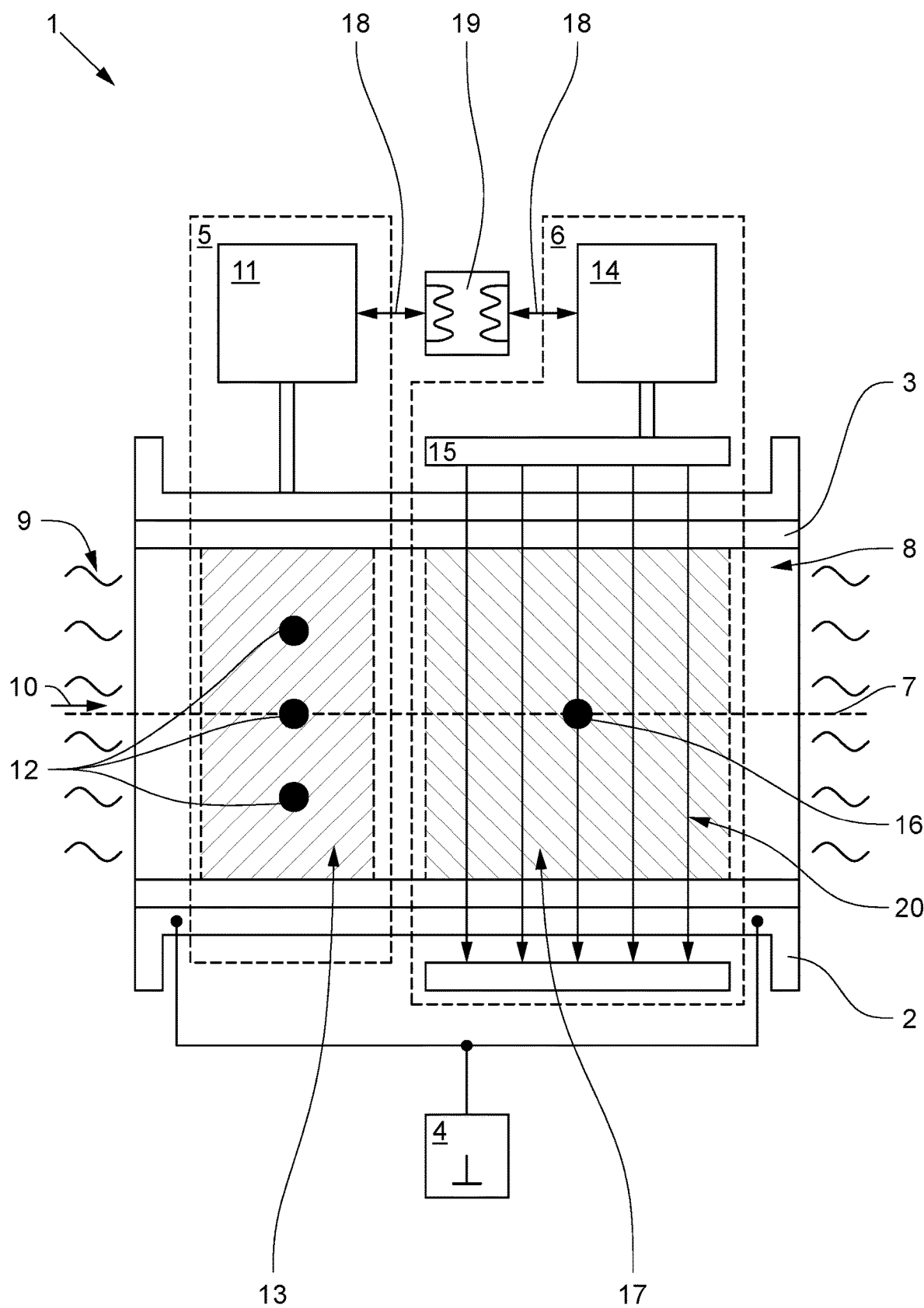
FIG. 1 illustrates a first embodiment of a measuring system.

FIG. 1 shows essential elements of an embodiment of a measuring system 1 abstracted in a longitudinal section.

The measuring system 1 has a measuring tube 2, a liner 3, a ground potential 4, a property measuring device 5 and a flowmeter 6.

The measuring tube 2 has a measuring tube interior 8 along a measuring tube longitudinal axis 7. The measuring tube interior 8 is lined with liner 3. The liner 3 electrically insulates the measuring tube 2 from a medium 9 in the measuring tube interior 8 and also protects it from wear by the medium 9. The medium 9 flows through the measuring tube 2 in the direction 10.

The measuring tube interior 8 is shielded against external interference. The shielding is implemented in that the measuring tube 2 has a connection to the ground potential 4 at each end of the measuring tube interior 8.

The property measuring device 5 has a property measuring controller 11 and twelve property measurement electrodes 12, although only three property measurement electrodes 12 are visible in FIG. 1. The twelve property measurement electrodes 12 are arranged in a first region 13 of the measuring tube interior 8 on the measuring tube 2. The first region 13 is indicated by shading in FIG. 1.

The flowmeter 6 has a flow measurement controller 14, a magnetic field generator 15 and two flow measurement electrodes 16, although only one flow measurement electrode 16 is visible in FIG. 1. The magnetic field generator 15 and the at least two flow measurement electrodes 16 are arranged on the measuring tube 2 in a second region 17 of the measuring tube interior 8, which is different from the first region 13.

The magnetic field generator 15 is designed for generating a switched DC magnetic field with a first magnetic field direction and a second magnetic field direction of the magnetic field 20 that is antiparallel to the first magnetic field direction. In FIG. 1, the first magnetic field direction is plotted.

The property measurement controller 11 and the flow measurement controller 14 are connected to each other via a signal line 18. In this connection, the signal line 18 has a galvanic isolation 19.

The property measurement controller 11 is designed for first carrying out a number of resistance measurements with the twelve property measurement electrodes 12 on the medium 9 in the first region 13 over an impedance measurement period, and then for determining both a proportion and a size distribution of solid components in the medium 9 as properties of the medium 9 from the resistance measurements using resistance tomography. Further, the property measurement controller 11 is designed for signaling the impedance measurement duration by a measurement signal to the flow measurement controller 14 via the signal line 18 during the resistance measurements.

The flow measurement controller 14 is designed for generating a magnetic field 20 in the medium 9 in the second region 17 by the magnetic field generator 15, and for carrying out a number of voltage measurements at a sampling rate with the two flow measurement electrodes 16 on the medium 9 in the second region 17. Further, the flow measurement controller 14 is designed for extracting the impedance measurement duration from the measurement signal, discarding the voltage measurements made during the resistance measurements, and determining the flow rate of the medium 9 from the remaining voltage measurements.

During operation, the measurement system 1 carries out the following method:

The number of resistance measurements with the twelve property measurement electrodes 12 is first carried out by the property measurement controller 11 on the medium 9 in the first region 13 over the impedance measurement period, and meanwhile the impedance measurement period is signaled by the measurement signal via the signal line 18 to the flow measurement controller 14, and then both the proportion and the size distribution of solid components in the medium 9 are determined from the resistance measurements using resistance tomography.

The magnetic field generator 15 is used by the flow measurement controller 14 to generate the magnetic field 20 in the medium 9 in the second region 17. Namely, the magnetic field generator 15 is controlled to generate the switched DC magnetic field. Thereby, a switching timing of the switched DC magnetic field is signaled by the flow measurement controller 14 to the property measurement controller 11 by a switching signal via the signal line 18. The changeover time is taken from the changeover signal by the property measurement controller 11 and the resistance measurements are started at the changeover time.

Further, the number of voltage measurements at the sampling rate with the two flow measurement electrodes 16 is carried out by the flow measurement controller 14 on the medium 9 in the second region 17 once during the first magnetic field direction and once during the second magnetic field direction, the impedance measurement duration is taken from the measurement signal, and the voltage measurements carried out during the impedance measurements are discarded for both magnetic field directions.

Further, the flow measurement controller determines the flow rate of the medium 9 from the remaining voltage measurements only if a number of the respective remaining voltage measurements is at least 30.

To determine the flow rate of the medium 9, an average value is formed by the flow measurement controller 14 from the remaining voltage measurements, separately for the first magnetic field direction and the second magnetic field direction.

The method described is carried out several times by the measuring system 1, which is why a number of average values are determined.

A trend is determined by the flow measurement controller 14 from a number of 7 average values in each case. Using the trend, the flow measurement controller 14 fills any gaps that may exist in a sequence of average values.

Figure 2:
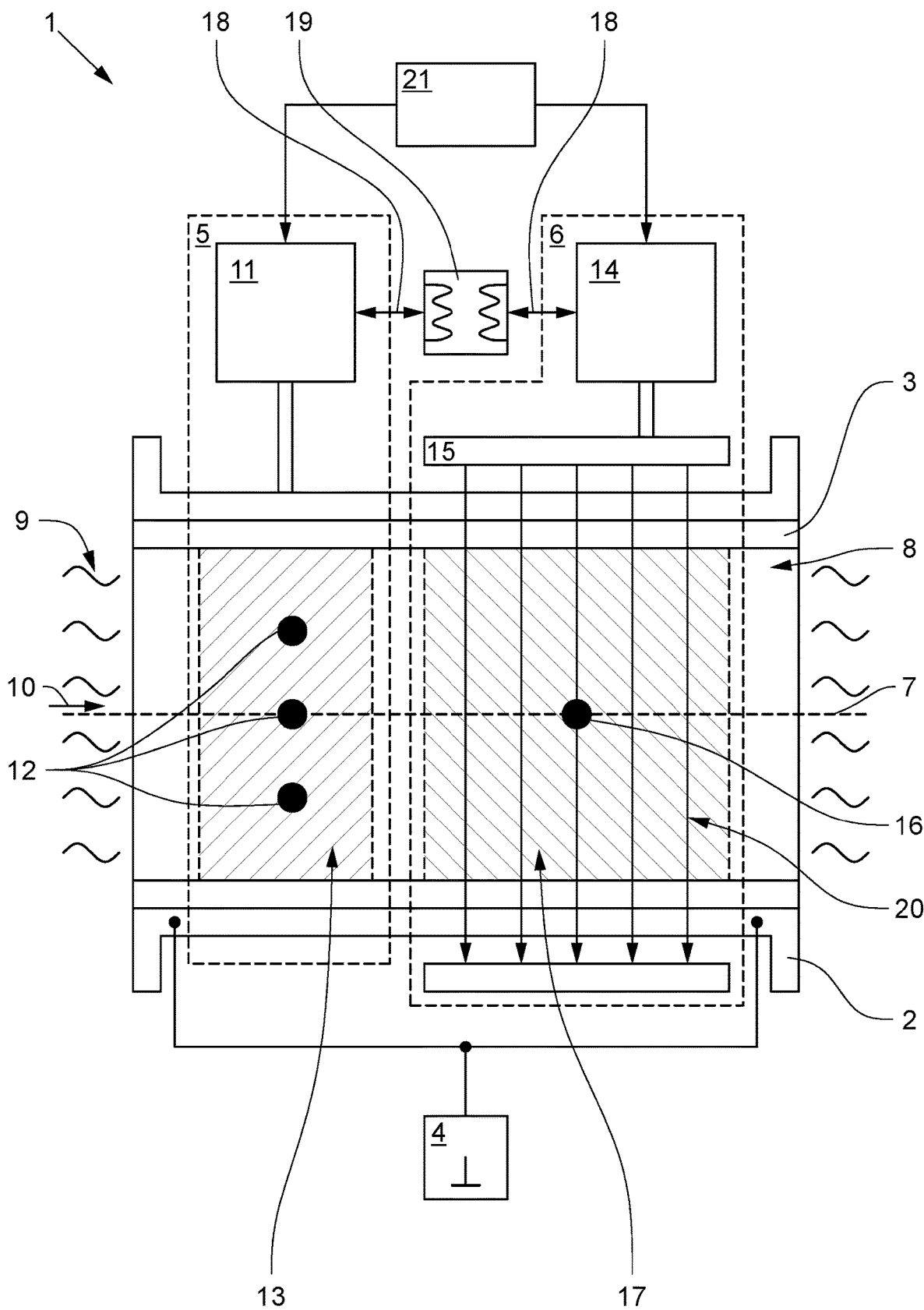
FIG. 2 illustrates a second embodiment of a measuring system.

FIG. 2 shows essential elements of a further embodiment of a measuring system 1 abstracted in a longitudinal section.

In the following, only the differences between the embodiment shown in FIG. 1 and the embodiment shown in FIG. 2 will be discussed. In all other respects, the comments regarding the embodiment shown in FIG. 1 apply accordingly to the embodiment shown in FIG. 2.

The measuring system 1 shown in FIG. 2 additionally has a clock-pulse generator 21. The clock-pulse generator 21 is designed for generating a clock-pulse with a clock period. The flow measurement controller 14 and the property measurement controller 11 are designed for carrying out the impedance measurements and the voltage measurements at different times from each other depending on the clock-pulse.

The property measurement controller 11 has an initialization phase and is designed for signaling a completion of the initialization phase by a first completion signal via the signal line 18 to the flow measurement controller 14.

The flow measurement controller 14 also has an initialization phase and is designed for signaling a completion of the initialization phase by a second completion signal via the signal line 18 to the property measurement controller 11.

The property measurement controller 14 is further designed for starting the execution of the impedance measurements triggered by receiving the second termination signal.

The flow measurement controller 11 is further designed for starting the generation of the magnetic field triggered by receiving the first termination signal.

The invention claimed is:

1. A method for operating a measuring system with a measuring tube, a liner, a shield, a property measuring device and a flowmeter, wherein the measuring tube has a measuring tube interior along a measuring tube longitudinal axis, wherein the measuring tube interior is lined with the liner and the liner electrically insulates the measuring tube from a medium in the measuring tube interior and protects it from wear by the medium, wherein the shielding shields the measuring tube interior from external interference, wherein the property measuring device comprises a property measurement controller and at least three property measurement electrodes and the at least three property measurement electrodes are arranged in a first region of the measuring tube interior on the measuring tube, wherein the flowmeter has a flow measurement controller, a magnetic field generator and at least two flow measurement electrodes, and the magnetic field generator and the at least two flow measurement electrodes are arranged on the measuring tube in a second region, different from the first region, of the measuring tube interior, wherein the flow measurement controller and the property measurement controller are connected to each other via a signal line, the method comprising:

carrying out, by the property measurement controller, a number of impedance measurements with the at least three property measurement electrodes on the medium in the first region over an impedance measurement period and, at the same time, signaling the impedance measurement period by a measuring signal via the signal line to the flow measurement controller;

determining at least one property of the medium from the impedance measurements using impedance tomography;

generating a magnetic field in the medium in the second region by the flow measurement controller using the magnetic field generator;

carrying out a number of voltage measurements at a sampling rate using the at least two flow measurement electrodes on the medium in the second region;

taking the impedance measurement duration from the measuring signal by the flow measurement controller;

discarding the voltage measurements carried out during the impedance measurements; and determining a flow rate of the medium from the remaining voltage measurements.

2. The method according to claim 1, wherein resistance measurements are carried out as the impedance measurements and the at least one property of the medium is determined from the impedance measurements using resistance tomography.

3. The method according to claim 1, wherein the at least one property is a proportion and/or a magnitude of solid constituents in the medium.

4. The method according to claim 1, wherein, after the determination of the at least one property, the property measurement controller waits for a duration before the next number of impedance measurements is carried out.

5. The method according to claim 1, wherein the flow rate of the medium is determined from the remaining voltage measurements only if a number of the remaining voltage measurements is at least 30.

6. The method according to claim 1, wherein an average value is formed from the remaining voltage measurements during the determination and for the determination of the flow rate.

7. The method according to claim 6, wherein the method is carried out several times; and
wherein a trend is determined from a number of the average values and gaps in a time sequence of the average values are filled using the trend.

8. The method according to claim 7, wherein the trend is formed from a number of 3 to 7 average values.

9. The method according to claim 7, wherein changes between younger average values are weighted more heavily than changes between older average values when determining the trend.

10. Then method according to claim 9, wherein the trend is determined by first determining a slope between each of two successive average values, and then determining an average slope by determining an average value first from the two oldest slopes and then from each of the previously determined average value and the next youngest slope.

11. The method according to claim 1, wherein the magnetic field generator is designed for generating a switched DC magnetic field with a first magnetic field direction and a second magnetic field direction of the magnetic field which is antiparallel to the first; and
wherein the magnetic field generator is controlled by the flow measurement controller for generating the switched DC magnetic field, the number of voltage measurements is carried out once during the first magnetic field direction and once during the second magnetic field direction, and the flow rate of the medium is determined from both numbers of voltage measurements.

12. The method according to claim 11, wherein the number of average values is determined separately for the first magnetic field direction and the second magnetic field direction.

13. The method according to claim 11, wherein a switching time of the switched DC magnetic field is signaled by the flow measurement controller during the activation of the magnetic field generator by a switching signal via the signal line to the property measurement controller; and
wherein the switching time is taken from the switching signal by the property measurement controller and the impedance measurements are started at the switching time.

14. A measuring system, comprising:
a measuring tube;
a liner;
a property measuring device; and
a flowmeter;
wherein the measuring tube has a measuring tube interior along a measuring tube longitudinal axis;
wherein the measuring tube interior is lined with the liner and the liner electrically insulates the measuring tube from a medium in the measuring tube interior and protects it from wear by the medium;
wherein the property measuring device comprises a property measurement controller and at least three property measurement electrodes and the at least three property measurement electrodes are arranged in a first region of the measuring tube interior space on the measuring tube;
wherein the property measurement controller is designed to first carry out a number of impedance measurements with the at least three property measurement electrodes on the medium in the first region over an impedance measurement period and then to determine at least one property of the medium from the impedance measurements using impedance tomography;
wherein the flowmeter comprises a flow measurement controller, a magnetic field generator and at least two flow measurement electrodes, and the magnetic field generator and the at least two flow measurement electrodes are arranged on the measuring tube in a second region of the measuring tube interior which is different from the first region;
wherein the flow measurement controller is designed for generating a magnetic field in the medium in the second region by means of the magnetic field generator, for carrying out a number of voltage measurements at a sampling rate with the at least two flow measurement electrodes on the medium in the second region, and for determining a flow rate of the medium from the voltage measurements;
wherein the measuring system comprises a shielding and a signal line;
wherein the shielding shields the measuring tube interior from external interference;
wherein the flow measurement controller and the property measurement controller are connected to one another via the signal line;
wherein the property measurement controller is designed for signaling the impedance measurement duration during the impedance measurements by means of a measuring signal via the signal line to the flow measurement controller; and
wherein the flow measurement controller is designed for obtaining the impedance measurement duration from the measuring signal, for discarding the voltage measurements carried out during the impedance measurements and for determining the flow rate of the medium from the remaining voltage measurements.

15. The measuring system according to claim 14, wherein the impedance measurement controller and the flow measurement controller are designed such that a delay time of the measuring signal is smaller than a period of the sampling rate.

16. A measuring system, comprising:
a measuring tube;
a liner;
a property measuring device; and
a flowmeter;
wherein the measuring tube has a measuring tube interior along a measuring tube longitudinal axis;
wherein the measuring tube interior is lined with the liner and the liner electrically insulates the measuring tube from a medium in the measuring tube interior and protects it from wear by the medium;

wherein the property measuring device comprises a property measurement controller and at least three property measurement electrodes and the at least three property measurement electrodes are arranged in a first region of the measuring tube interior on the measuring tube;

wherein the property measurement controller is designed for first performing a number of impedance measurements with the at least three property measurement electrodes on the medium in the first region over an impedance measurement period and then for determining at least one property of the medium from the impedance measurements using impedance tomography;

wherein the flowmeter comprises a flow measurement controller, a magnetic field generator and at least two flow measurement electrodes, and the magnetic field generator and the at least two flow measurement electrodes are arranged on the measuring tube in a second region of the measuring tube interior which is different from the first region;

wherein the flow measurement controller is designed for generating a magnetic field in the medium in the second region by means of the magnetic field generator, for carrying out a number of voltage measurements at a sampling rate with the at least two flow measurement electrodes on the medium in the second region, and for determining a flow rate of the medium from the voltage measurements;

wherein the measuring system has a shield, a signal line and a clock-pulse generator;

wherein the shielding shields the measuring tube interior from external interference;

wherein the flow measurement controller and the property measurement controller are connected, on the one hand, to one another and, on the other hand, in each case to the clock-pulse generator via the signal line;

wherein the clock-pulse generator is designed for generating a clock pulse with a clock period;

wherein the flow measurement controller and the property measurement controller are designed for carrying out the impedance measurements and the voltage measurements at times which are different from one another depending on the clock pulse;

wherein the property measurement controller has an initialization phase and is designed to signal completion of the initialization phase by a first completion signal via the signal line to the flow measurement controller;

wherein the flow measurement controller has an initialization phase and is designed for signaling a termination of the initialization phase by a second termination signal via the signal line to the property measurement controller;

wherein the property measurement controller is designed for starting to carry out the impedance measurements triggered by a reception of the second termination signal; and wherein the flow measurement controller is designed for starting to generate the magnetic field triggered by receiving the first termination signal.

17. The measuring system according to claim 16, wherein a duration of carrying out the impedance measurements and determining the at least one property of the medium form a property measurement cycle;

wherein a duration of generating the magnetic field, carrying out the voltage measurements and determining the flow rate of the medium form a flow measurement cycle; and wherein the property measurement cycle and the flow measurement cycle are each an integral multiple of the clock period.

18. The measuring system according to claim 17, wherein the integer multiple is equal to $2^n$, wherein n is a positive integer.

19. The measuring system according to claim 15, wherein the measuring system has an ground potential; and wherein the shielding is implemented in that the measuring tube has a connection to the ground potential at each of the two ends of the measuring tube interior.

20. The measuring system according to claim 15, wherein the signal line has a galvanic isolation.

21. The measuring system according to claim 15, wherein the measuring system is designed such that at least one of:

resistance measurements are carried out as the impedance measurements and the at least one property of the medium is determined from the impedance measurement using resistance tomography;

the at least a proportion and/or a magnitude of solid constituents in the medium;

after the determination of the at least one property, the property measurement controller waits for a duration before the next number of impedance measurements is carried out;

the flow rate of the medium is determined from the remaining voltage measurements only if a number of voltage measurements is at least 30;

an average value is formed from the remaining voltage measurements during the determination and for the determination of the flow rate;

the method is carried out several times, and a trend is determined from a number of the average values and gaps in a time sequence of the average values are filled using the trend;

the trend is formed from a number of 3 to 7 values;

changes between younger average values are weighted more heavily than changes between older average values when determining the trend;

the trend is determined by first determining a slope between each of two successive average values, and then determining an average slope by determining an average value first from the two oldest slopes and then from each of the previously determined average value and the next youngest slope;

the magnetic field generator is designed for generating a switched DC magnetic field with a first magnetic field direction and a second magnetic field direction of the magnetic field which is antiparallel to the first, and the magnetic field generator is controlled by the flow measurement controller for generating the switched DC magnetic field, the number of voltage measurements is carried out once during the first magnetic field direction and once during the second magnetic field direction, and the flow rate of the medium is determined from both numbers of voltage measurements;

the number of average values is determined separately for the first magnetic field direction and the second magnetic field direction; and a switching time of the switched DC magnetic field is signaled by the flow measurement controller during the activation of the magnetic field generator by a switching signal via the signal line to the property measurement controller, and the switching time is taken from the switching signal by the property measurement controller and the impedance measurements are started at the switching time.

* * * * *